United States Patent [19]

Russiello

[11] Patent Number: 4,554,308

[45] Date of Patent: Nov. 19, 1985

[54] CROSSLINKED POLYURETHANE DISPERSIONS

[75] Inventor: Andrea Russiello, Kelton, Pa.

[73] Assignee: Wilmington Chemical Corporation, Wilmington, Del.

[21] Appl. No.: 947,544

[22] Filed: Oct. 2, 1978

[51] Int. Cl.[4] .............................................. C08L 75/04
[52] U.S. Cl. .................................... 524/591; 524/589; 524/590; 524/839; 524/840
[58] Field of Search ................. 260/29.2 TN; 524/839, 524/591, 840, 589, 590

[56] References Cited

U.S. PATENT DOCUMENTS

| | | | |
|---|---|---|---|
| 3,412,054 | 11/1968 | Milligan et al. | 260/29.2 TN |
| 3,870,684 | 3/1975 | Witt et al. | 260/29.2 TN |
| 3,923,713 | 12/1975 | Hermann | 260/29.2 TN |
| 3,948,837 | 4/1976 | Schmitt et al. | 260/29.2 TN |
| 4,016,122 | 4/1977 | Matsuda et al. | 260/29.2 TN |
| 4,046,729 | 9/1977 | Scriven et al. | 260/29.2 TN |
| 4,092,286 | 5/1978 | Noll et al. | 260/29.2 TN |
| 4,147,679 | 4/1979 | Scriven et al. | 260/29.2 TN |
| 4,203,883 | 5/1980 | Hangauer | 525/453 |
| 4,387,181 | 6/1983 | Brown et al. | 524/591 |

FOREIGN PATENT DOCUMENTS

| | | |
|---|---|---|
| 2808503 | 2/1978 | Fed. Rep. of Germany . |
| 1078202 | 8/1967 | United Kingdom ........ 260/29.2 TN |
| 1128568 | 9/1968 | United Kingdom ........ 260/29.2 TN |

OTHER PUBLICATIONS

Flory, Principles of Polymer Chemistry, pp. 347–354, 1953.

Primary Examiner—Allan M. Lieberman
Attorney, Agent, or Firm—Webb, Burden, Robinson & Webb

[57] ABSTRACT

Stable aqueous dispersions of crosslinked polyurethane particles are disclosed. Preferably the aqueous dispersions coalesce, upon drying, to form continuous films. The aqueous dispersions of crosslinked polyurethane particles are formed by reacting a mixture of polyfunctional hydrogen compounds, one of which has an ionically neutralizable solubilizing group thereon and one of which has a functionality of three or more, with a diisocyanate to form a non-crosslinked or ungelled prepolymer. The solubilizing group is neutralized and the prepolymer is dispersed in water. The prepolymer is chain extended with water or an aqueous solution of a water soluble diamine to form an isocyanate free dispersion of crosslinked polyurethane polymer.

25 Claims, No Drawings

CROSSLINKED POLYURETHANE DISPERSIONS

BACKGROUND OF THE INVENTION

1. Field of the Invention

This invention relates to aqueous polyurethane dispersions and more particularly to crosslinked polyurethane dispersions.

2. Description of the Prior Art

Water dispersable polyurethanes are well known and have achieved acceptance in a variety of applications. U.S. Pat. No. 2,968,595 discloses the emulsification of free isocyanate containing prepolymers in a solution of diamine and water with the aid of detergents and under the action of powerful shearing forces. The free isocyanate reacts with the water and diamine to "chain extend" the polyurethane polymer to form dispersed particles of thermoplastic polyurethane polymer. As is taught by U.S. Pat. No. 2,968,595, the resultant emulsion can be cast and dried to form a thermoplastic polyurethane film or coating. The emulsions prepared according to the 2,968,595 patent have the disadvantage that in forming the emulsion a detergent must be used. Because the detergent is not volatile and inherently contains hydrophilic groups, the physical and chemical properties of the resultant coating are adversely affected by the detergent. In addition, insufficient shearing force often results in an unstable emulsion. Further, the emulsion cannot be produced in conventional reaction kettles because of the high shearing forces required to form a homogeneous stable emulsion.

The prior art, particularly U.S. Pat. No. 3,479,310, has suggested and taught that a fully chain extended, isocyanate-free polyurethane, having an internal salt along the chain, be prepared and dispersed in water. However, the chain extension results in a high viscosity, high molecular weight product which is difficult to disperse in water. The dispersion in water requires thinning the polymer in organic solvents to achieve the requisite viscosity for emulsification, thus requiring removal of organic solvents, by steam distillation or the like, to achieve the advantages of an aqueous system.

Further, the synthesis-dispersion technique provides a coarse dispersion and requires a high percentage of internal salt groups to effect a stable dispersion. Because of the hydrophilic nature imparted to the polymer by the high percentage of internal salt groups, coatings formed from dried cast films are moisture sensitive.

The presently preferred and accepted system for preparing ionic polyurethane dispersions is by synthesizing polymers that have free acid groups covalently bonded to the polymer chain or backbone. Neutralization of these acid groups with an amine, preferably a water soluble monoamine, yields a water reducible polymer. Preferably the acid group is a carboxylic acid group but phosphorous or sulfur based acid groups may also be used. The compound bearing the acid group must be carefully selected so that the isocyanate groups, necessary to form the polyurethane, do not react therewith. This is accomplished, typically, by selecting a compound which has a sterically hindered acid group having reduced reactivity with isocyanate groups. Exemplary of the use of the sterically hindered acid group principle are the teachings and the disclosure of U.S. Pat. No. 3,412,054, incorporated by reference herein, wherein 2,2-hydroxymethyl substituted carboxylic acids are reacted with organic isocyanate groups without significant reaction between the acid and isocyanate groups due to steric hinderance of the carboxyl groups by the adjacent alkyl groups. This approach provides the desired carboxyl containing polymer with the carboxylic group being neutralized with a tertiary monoamine to provide an internal quaternary ammonium salt and hence, water reducibility.

Since fully chain extended high molecular weight, isocyanate free polyurethanes tend to have very high viscosities even at elevated temperatures, it is not practical to disperse them in water after the chain extension reaction has been completed. The preferred method is to make an isocyanate-terminated prepolymer containing the solubilizing amine salt of the carboxylic acid and disperse the prepolymer in water while the prepolymer is at a workable viscosity. Once the prepolymer is dispersed in the water, chain extension to high molecular weight takes place in the dispersed droplets by reaction with water or with any suitable chain extender that is present in the water, for example, a water soluble diamine.

It is well known to those of ordinary skill in the art that in the preparation of fully reacted polyurethane polymers that are to be cast in solution as films or coatings, that the use of reactants with a functionality of greater than two is very hazardous since they promote branching and unless the branching is controlled will quickly result in the gelation of the growing polymer chains into an intractable mass. Knowing the concentration and functionality of each of the reactants yields the predictability of knowing at what point during the reaction that the growing polymer will become an insoluble continuous network or gel, i.e., crosslinked. These calculations for the gel point are well defined in such textbooks as Flory's *Principles of Polymer Chemistry*. They may be found in Chapter IX entitled "Molecular Weight Distributions in Nonlinear Polymers and the Theory of Gelation", pages 347-361, incorporated herein by reference.

While numerous cross-links in a coating have obvious advantages in terms of solvent resistance and heat resistance, it is generally not possible to prepare such a film or coating without resorting to two component systems with all their inherent disadvantages or to polymers with built-in reactive sites that require heat or radiation for crosslinking. Although numerous urethane coatings have been commercialized using the two component systems and built-in reactive sites, a desirable improvement in the state of the art would be to achieve a product comparable to these systems without their attendant disadvantages.

Thus, in accordance with the present invention a process for preparing crosslinked but coalescible dispersed polymer particles is provided. Further, these particles, being cast from an aqueous dispersion, are film forming at room temperature, thus requiring no heat that can damage sensitive substrates.

Further, in accordance with the present invention, the advantages of a fully reacted system without highly reactive and toxic co-reactants are provided. Further, the attendant advantages of an aqueous system are provided by the present invention.

BRIEF DESCRIPTION OF THE INVENTION

Stable aqueous dispersions of crosslinked polyurethane particles are prepared. Preferably, the aqueous dispersions coalesce, upon drying, to form continuous films. The method of forming the dispersions involves the reaction of a mixture of polyfunctional reactive hydrogen compounds comprised of a polyfunctional reactive hydrogen compound having a functionality of three or more and a polyfunctional reactive hydrogen compound having an ionically neutralizable solubilizing group thereon, with a diisocyanate to form a non-cross-linked or ungelled prepolymer. The prepolymer is neutralized through the ionically neutralizable solubilizing group. The prepolymer is then chain extended with water or an aqueous solution of a water soluble diamine to form an isocyanate-free dispersion of crosslinked polyurethane polymer. Preferably, the polyurethane polymer is characterized by its capability of forming a continuous film upon drying the dispersion at 65° to 75° F. at atmospheric pressure.

DETAILED DESCRIPTION OF THE INVENTION

The preferred system for preparing ionic aqueous polyurethane dispersions is to prepare polymers that have free acid groups, preferably carboxylic acid groups, covalently bonded to the polymer backbone. Neutralization of these carboxyl groups with an amine, preferably a water soluble monoamine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl substituted carboxylic acids can be reacted with organic polyisocyanates without significant reaction between the acid and isocyanate groups due to the steric hinderance of the carboxyl by the adjacent alkyl groups. This approach provides the desired carboxyl containing polymer with the carboxylic acid groups being neutralized with the tertiary monoamine to provide an internal quaternary ammonium salt and hence, water dilutability.

Suitable carboxylic acids and preferably, the sterically hindered carboxylic acids, are well known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula,

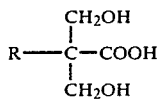

wherein R represents hydrogen, or alkyl of up to 20 carbon atoms, and preferably, up to eight carbon atoms. A preferred acid is 2,2-di(hydroxymethyl) propionic acid. The polymers with the pendant carboxyl groups are characterized as anionic polyurethane polymers.

The polyurethanes useful in the practice of the invention, more particularly involve the reaction of di- or polyisocyanates and compounds with multiple reactive hydrogens suitable for the preparation of polyurethanes. Such diisocyanates and reactive hydrogen compounds are, in general, more fully disclosed in U.S. Pat. Nos. 3,412,034 and 4,046,729, incorporated herein by reference.

In accordance with the present invention, aromatic, aliphatic and cycloaliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronapthylene diisocyanate; isophorone diisocyanate and the like. Preferably, the arylene and cycloaliphatic diisocyanates are used most advantageously in the practice of the invention.

Characteristically, the arylene diisocyanates encompass those in which the isocyanate group is attached to the aromatic ring. The most preferred isocyanates are the 2,4 and 2,6 isomers of tolylene diisocyanate and mixtures thereof, due to their ready availability and their reactivity. Further, the cycloaliphatic diisocyanates used most advantageously in the practice of the present invention are 4,4'-methylene-bis(cyclohexyl isocyanate) and isophorone diisocyanate.

Selection of the aromatic or aliphatic diisocyanate is predicated upon the final end use of the particular material. As is well recognized by those skilled in the art, the aromatic isocyanates may be used where the final product is not excessively exposed to ultraviolet radiation which tends to yellow such polymeric compositions; whereas the aliphatic diisocyanates may be more advantageously used in exterior applications and have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethanes. In addition, antioxidants may be added in art recognized levels to improve the characteristics of the final product. Typical antioxidants are the thioethers and phenolic antioxidants such as 4,4'-butylidine bis-meta-cresol and 2,6-ditertbutyl-para-cresol.

The isocyanate is reacted with a mixture of the polyfunctional reactive hydrogen compounds. This mixture contains at least two components. One component is the polyfunctional reactive hydrogen compound which contains the ionically solubilizing group and is typically a diol (the hydroxyl hydrogens constituting the "reactive hydrogens") containing a sterically hindered carboxyl group as previously described. The other required component is an active hydrogen compound, preferably with hydroxyl functionality, having a functionality of three or more. Examples of such active hydrogen compounds having a functionality of three or more are glycerol, trimethylol propane, pentaerythritol, amines having a functionality of three or greater and the poly (ethyleneoxy) and poly (propyleneoxy) derivatives thereof. Also triols, tetrols and higher functionality polyols useful in the practice of the invention which have polycaprolactone segments within the polyol chain may be used. Within the scope of the invention practically any polyol having a functionality of three or greater may be used; however, the polyoxyethylene and polyoxypropylene derivatives of the triols and tetrols are preferred. Further preferred are those polyols having a molecular weight greater than 2,000 and which normally impart elastomeric behavior to polyurethanes into which they are incorporated.

In addition to the polyfunctional reactive hydrogen compounds having a functionality of three or greater and those which contain the solubilizing group, difunctional active hydrogen compounds may also be used. These difunctional active hydrogen compounds may be either diamines or diols. In the case of diols they are typically either polyalkylene ether or polyester diols including oxyalkylated amines. A polyalkylene ether diol is the presently preferred active hydrogen containing polymeric material for formulation of the polyurethane. The most useful diols have a molecular weight of 50 to 10,000 and in the context of the present invention, the most preferred is from about 400 to about 7,000. Further, the polyether diols improve flexibility proportionally with the increase in their molecular weight.

Examples of the polyether diols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol and mixtures thereof. Diols containing several different radicals in the molecular chain, such as, for example, the compound $HO(CH_2OC_2H_4O)_nH$ wherein n is an integer greater than one, can also be used.

The diol may also be a hydroxy terminated or hydroxy pendant polyester which can be used instead of or in combination with the polyalkylene ether glycols. Exemplary of such polyesters are those formed by reacting acids, esters or acid halides with diols. Suitable diols are polymethylene glycols such as ethylene, propylene, tetramethylene or decamethylene glycol; substituted methylene diols such as 2,2-dimethyl-1,3-propane diol, cyclic glycols such as cyclohexanediol and aromatic diols. Aliphatic diols are generally preferred when flexibility is desired. These diols are reacted with aliphatic, cycloaliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition, polycaprolactones terminated with hydroxyl groups may also be used.

When used herein, "ionic dispersing agent" means a water soluble ionizable acid or base capable of forming a salt with the solubilizing agent. These "ionic dispersing agents" are amines and preferably water soluble amines such as triethylamine, tripropylamine, N-ethyl piperidine, and the like.

In forming the polyurethanes of the invention the reaction times and temperatures are typically those employed and recognized by those skilled in the art for conventional polyurethane synthesis. Although suitable reaction conditions and reaction times and temperatures are variable within the context of the particular isocyanate and polyol utilized, those skilled in the art well recognize these variations. Such skilled artisans recognize that reactivity of the ingredients involved require the balance of the reaction rate with undesirable secondary reactions leading to color and molecular weight degradation.

In order to prepare the polyurethane dispersions of the invention the stoichiometry of the particular system must be analyzed to obtain the dispersion of crosslinked polyurethane polymers. A consideration of the application of the equations in *Principles of Polymer Chemistry* (previously cited) is instructive in determining the stoichiometry and mechanism involved in forming the dispersions of crosslinked polyurethane polymer. The nomenclature utilized herein has been modified slightly from Flory's *Principles of Polymer Chemistry*, Chapter IX, pages 347–354, to make it explicit to the functional monomers used in the polyurethane dispersions.

Definitions:

$P_{OH}$ = the probability that an OH group has reacted which is the same as the fraction of OH groups reacted.

$P_{NCO}$ = the probability that an NCO group has reacted which is the same as the fraction of NCO groups reacted.

$\rho$ = the ratio of OH groups in branch units/total number of OH groups.

$\alpha$ = the probability than an OH group selected at random from the trifunctional (or higher functionality) polyol is connected to a chain, the far end of which connects to another branch unit, i.e. trifunctional polyol.

$f$ = the functionality of trifunctional or higher functionality polyol.

Within the scope of these definitions, Equation 1 on page 351 of Flory becomes:

$$\alpha = P_{OH} P_{NCO}\rho/[1 - P_{OH}P_{NCO}(1-\rho)], \quad \text{(Eq. 1)}$$

$\alpha_c$, the critical value for $\alpha$ beyond which gelation or crosslinking occurs, is still defined by Equation 7 at page 353 as:

$$\alpha_c = 1/(f-1)$$

therefore $\alpha_c$ for triols is $\frac{1}{2}$, for tetrols $\frac{1}{3}$, etc.

In order to prepare the polyurethanes of the invention, the polyisocyanate is reacted with the particular polyfunctional reactive hydrogen compounds required and/or selected as previously discussed to form a free isocyanate containing polyurethane prepolymer. The ionic dispersing agent is added to the prepolymer and the solubilization and chain extension is conducted sequentially.

A general method of dispersion preparation is described below.

Typically the reaction between the isocyanate and the active hydrogen compound having a functionality of three or more is carried out with stirring at about 50° C. to about 120° C. for about one to four hours. To provide pendant carboxyl groups the isocyanate terminated polymer is reacted with a molar deficiency of dihydroxy acid, for one to four hours at 50° C. to 120° C. to form isocyanate terminated prepolymer. The acid is desirably added as a solution, for example, in N-methyl 2-pyrrolidone or N-N-dimethylformamide. The solvent for the acid will typically be no more than about 5 percent of the total charge in order to minimize the organic solvent concentration in the polyurethane composition. After the dihydroxy acid is reacted into the polymer chain, the pendant carboxyl groups are neutralized with an amine at about 58°–75° C. for about 20 minutes and dispersion and chain extension is accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. The reaction of all of the isocyanate groups causes the polyurethane particles to be crosslinked in the dispersion.

Sufficient water is used to disperse the polyurethane at a concentration of about 10–50 percent by weight solids and dispersion viscosity in the range of 10–5,000 centipoise. Viscosity may be adjusted in accordance with the particular properties desired and by the particular dispersion composition which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

The characterization of the dispersions prepared in accordance with the invention is done by measurements of non-volatile content, particle size, viscosity, stress strain properties on strips of cast film and insolubility in strong solvents for the cast film.

Particle size, as a useful measure of stability, may be measured by light absorption. Useful dispersions having non-settling characteristics will have particles of a diameter of less than one micron.

Viscosity of the dispersion is typically 10–5,000 centipoise at 10–50 percent solids and may be higher if desired.

Insolubility of the films cast from the dispersions at room temperature in strong solvents for polyurethanes, such as dimethylformamide and tetrahydrofuran are characteristic of the dispersions of the invention.

The polyurethane dispersions prepared according to the invention may be used as fabric coatings, leather finishes and a host of other uses. One particular application is in the preparation of coated fabrics and leather-like materials, as is disclosed in U.S. patent application Ser. No. 940,389 by Gordon M. Parker entitled "Method of Preparing Composite Sheet Material" filed Sept. 7, 1978, incorporated herein by reference.

The following examples will more fully illustrate the details of the invention

EXAMPLE 1

| Ingredient | Parts by Weight |
| --- | --- |
| Tolylene diisocyanate | 4.0 |
| GP-6500 triol (OH #28 from Choate Chemical Co.) Chemical Abstract Service #9082-00-2 trifunctional hydroxy compound of oxyalkylated glycerol | 23.0 |
| dimethylol propionic acid (2,2-bis-hydroxy-methyl) propionic acid | 1.2 |
| N—methyl-2 pyrrolidone | 2.4 |
| N—ethyl morpholine | 1.0 |
| water | 68.4 |

The GP-6500 triol and tolylene diisocyanate were combined under an inert nitrogen atmosphere with stirring at 10°–30° C. The temperature was maintained at not more than 70° C. for two hours to react the polyol and the diisocyanate. A solution of the dimethylol propionic acid in the pyrrolidone was then added to the isocyanate-terminated prepolymer. After the addition of the acid, temperature was maintained at below 70° C. for a period of 30–90 minutes. The N-ethyl morpholine was added to neutralize the non-crosslinked isocyanate containing prepolymer. Temperature was held in the range of 55°–75° C. for a period of 15–30 minutes. The chain extension and dispersion of the neutralized prepolymer in water was accomplished by a programmed addition of the prepolymer to the water with stirring until the bubbling caused by the chain extension reaction in water subsides. The addition to water and subsequent stirring with a final temperature of 40°–60° C. requires one to four hours.

The non-volatile content is adjusted to 30 percent by addition of water to the completed dispersion. The viscosity of this dispersion is 350 centipoise, measured by using a Brookfield RVT viscometer. The average particle size estimated from light absorption (Bausch & Lomb Spectronic 20) was 0.7 microns. Properties measured using Instron Model 1130 on films cast from the dispersion were as follows:

| | |
| --- | --- |
| 100 percent Modulus (stress required to double length of samples) | 75 psi |
| Tensile strength | 370 psi |
| Elongation | 800% |
| Recovery | 80% |

From the calculation of the gel point of the prepolymer, as is demonstrated below, it appears that the prepolymer was very close to the gel point before dispersing. A cast film dried at room temperature of this dispersion weighing 0.1 grams was immersed in dimethylformamide at 100° C. for three hours with stirring and did not dissolve. This insolubility further demonstrates the crosslinked characteristics of the polyurethane dispersions of the invention.

An analysis of Example 1 by way of the equations previously set forth will illustrate the principles of the invention.

| Reactants | Functionality | Equivalents |
| --- | --- | --- |
| GP - 6500 | 3 | 1.0 |
| dimethylol propionic acid | 2 | 1.42 |
| Water | 2 or 1 | Excess |
| tolylene diisocyanate | 2 | 3.9 |

$P_{OH} = 1.0$
$\rho = 0.413$
$\alpha = (P_{OH})(P_{NCO})\rho / [1 - P_{OH} P_{NCO}(1 - \rho)]$
$\alpha = 0.402$ The present NCO at the start of the dispersing step was 2.4. From the gel point equations, it may be calculated that after only 32.40 percent of the remaining isocyanate reacts with a difunctional chain extender, the growing chains become infinite networks and hence crosslinked. It is critical in preparing the non-gelled or non-crosslinked prepolymers containing the desired solubilizing ionic groups from triols or higher functionality polyols that a sufficient excess of isocyanate must be used to prevent crosslinking prior to chain extension.

Thus, in relation to this example, although applicable to the invention in general, it is easily demonstrated by holding the quantities of OH containing molecules constant and reducing the excess of tolylene diisocyanate, that a value of 0.5 for $\alpha$, e.g. gelation or crosslinking, would be reached when $P_{NCO}$ is 0.708 or when the equivalents of tolylene diisocyanate are reduced from 3.2 to 3.42. Thus, one essential factor in preparing the dispersions of the present invention is that a sufficient excess of isocyanate is used so that the prepolymers do not reach or exceed $\alpha_c$ at the point where all of the hydroxyl functionality present in this initial reaction, i.e. the formation of the prepolymers with the solubilizing ionic groups, is consumed.

In the next step of the preparation of the dispersions, the prepolymers containing the solubilizing ionic groups are dispersed in water or in dilute-aqueous solutions of diamines. When only water is present, the following reactions are believed to predominate:

$$\sim NCO + H_2O \rightarrow \sim NHCOOH \quad (i)$$

$$\sim NHCOOH \rightarrow \sim NH_2 + CO_2 \quad (ii)$$

$$\sim NH_2 + OCN \sim \rightarrow \sim NHCONH \sim \quad (iii)$$

When a water soluble diamine is present in amounts approximating the amount of unreacted NCO groups in the prepolymer, the following reaction is believed to predominate:

$$\sim NCO + H_2NRNH_2 + OCN \sim \rightarrow \sim NHCONHRNHCONH \sim \quad (iv)$$

where $\sim$ represents a segment of the polymer chain.

In either case as the prepolymer is being dispersed a chain lengthening is taking place by reaction with the difunctional amine or water molecules. In Example 1, calculation of the amount of difunctional chain extender needed to bring the chain extending prepolymer to the point of gelation is providing by defining X to be that amount, therefore the other components of Equation 1 become:

$$P_{OH} = 1.0; \; P_{NCO} = \frac{2.42 + X}{3.9}; \; \rho = \frac{1.0}{2.42 + X}; \; \alpha = 0.5$$

Solving for X we find X=0.48.

At the beginning of the chain extension in water there are 1.48 equivalents of NCO still unreacted per equivalent of triol initially charged. At the point where slightly less than ⅓ of these NCO groups have reacted with a difunctional chain extender, the prepolymer will gel. It is necessary for the rate of reaction, at least initially, to be slow enough so that the prepolymers containing the solubilizing ionic groups can be dispersed into very small droplets, e.g. on the order of 1.0 micron or less, prior to the gelation taking place and yet fast enough so that the reaction can be completed without tying up equipment for an inordinant amount of time. When a diamine is used as the chain extender, the amine groups react very quickly with the NCO groups as they are added and the diamine is believed to be truly functioning as a difunctional chain extender. In this case, the amount of chain extender needed to cause the particles to gel is readily estimated. When water is the chain extender the estimation is much more complicated. When the prepolymer containing the solubilizing ionic groups is dispersed in the water some of the NCO groups react with water to form the corresponding carbamic acid (see Equation i above), some of the carbamic acid groups decompose to form carbon dioxide and an amine (Equation ii above), and the amine reacts very rapidly with any remaining NCO groups to form a urea linkage (Equation iii above). It is only after this sequence of three reactions that water has served as a difunctional chain extender. If reaction (i) is much faster than (ii) then very little chain extension takes place for all of the NCO will be consumed by reaction with water before any amine is formed. If reaction (ii) is much faster than (i) then most of the water consumed by reaction will serve as a difunctional chain extender. In reality, the situation is very complex since the relative rates of reaction of (i) and (ii) depend on the structure of the isocyanate used, choice of catalysts, if any, catalytic effects of other reactants, temperature and may also be dependent on rates of diffusion when the unreacted chain ends are buried inside the dispersed droplets of prepolymer. Accordingly, when water is used as the only chain extender it is not possible to predict at just what point in the reaction of the remaining unreacted NCO that gelation will occur. However, as will be seen in the examples, gelation does occur and can easily be detected even without the specific knowledge of what fraction of the water that is reacting ends up as a difunctional chain extender. The limitations are that the prepolymer be uncrosslinked prior to dispersion in water and crosslinked subsequent to dispersion and chain extension.

EXAMPLE 2

| Ingredient | Parts by Weight |
| --- | --- |
| Tolylene diisocyanate | 4.3 |
| Niax ® Polyol 11-27 triol (OH#27 from Union Carbide Chemical Abstract Service Number CAS-39289-79-7) | 23.8 |
| Dimethylol propionic acid (2,2-Bis (Hydroxymethyl) propionic acid) | 1.1 |
| N—methyl-2-pyrrolidone | 2.3 |
| N—ethyl morpholine | 1.0 |
| Water | 67.5 |

The tolylene diisocyanate was combined with the Niax ® Polyol 11-27 with stirring under an inert atmosphere at 10°–30° C. The isocyanate and the polyol were reacted for two hours while maintaining the temperature at 70° C. or less. A solution of the dimethylol propionic acid in the pyrrolidone was then added to the triol/diisocyanate reaction product. After addition, temperature was again maintained at 70° C. or less for a period of two hours. The morpholine was added to neutralize the polymer while keeping the temperature in the range of 60°–80° C. for 15–30 minutes. The chain extension and dispersion of the polymer in water was accomplished by the addition to water with stirring until the bubbling caused by the chain extension reaction in water subsided. The addition to water and subsequent stirring with a final temperature of 40°–60° C. took one to four hours.

The non-volatile content was adjusted to 30 percent by addition of water to the completed dispersion. The viscosity of this dispersion was 240 centipoise, measured on a Brookfield RVT viscometer. The average particle size, estimated from light absorption (Bausch & Lomb Spectronic 20) was 0.85 microns. Properties measured using Instron Model 1130 on films cast from the dispersion were as follows:

| 100 percent Modulus | 10 psi |
|---|---|
| Tensile strength | 280 psi |
| Elongation | 950% |
| Recovery | 70% |

The films cast from this dispersion at room temperature were insoluble in dimethylformamide and tetrahydrofuran. From the calculations of the gel point for this polymer, it is shown that the polymer was approaching gelation when it was dispersed.

| Reactants | Functionality | Equivalents |
|---|---|---|
| Niax ® Polyol 11-27 | 3 | 1.0 |
| Dimethylol propionic acid | 2 | 1.42 |
| Water | 2 or 1 | Excess |
| Tolylene diisocyanate | 2 | 4.3 |
| $P_{OH} = 1.0$ | $P_{NCO} = 0.653$ | |
| $\rho = 0.413$ | | |
| $\alpha = (P_{OH})(P_{NCO})\rho/[1 - P_{OH} P_{NCO}(1 - \rho)]$ | | |
| $\alpha = 0.34$ | | |
| $\alpha_c = 0.5 =$ Gel Point | | |

The percent NCO at the start of the dispersing step was 2.87. From the gel point equations, it may be calculated that after only 30.6% of the remaining isocyanate reacts with a difunctional chain extender, the growing chains become infinite networks.

EXAMPLE 3

| Ingredient | Parts by Weight |
|---|---|
| Hylene W ® | 8.7 |
| (4,4'-methylene-biscyclohexyl isocyanate) E.I. DuPont deNemours | |
| GP-6500 triol | 28.4 |
| (OH#28 from Choate Chemical Co.) | |
| T-12 Catalyst | 0.002 |
| (dibutyltin dilaurate from M & T Chemical) | |
| dimethylol propionic acid | 1.4 |
| (2,2-Bis(hydroxymethyl) propionic acid | |
| N—methyl-2-pyrrolidone | 3.0 |
| Santo-white ® (Monsanto antioxidant) | 0.5 |
| N—ethyl morpholine | 1.2 |
| Water | 56.8 |

4,4'-methylene-bis(cyclohexyl isocyanate) and the GP-6500 triol were combined under inert atmosphere with stirring while maintaining temperature within the range of 15°-30° C. Approximately one-half of the T-12 catalyst was added and the temperature was raised to 60°-85° C. and maintained for one to two hours. A solution of dimethylol propionic acid and Santo-white antioxidant in the pyrrolidone was added to the polyol/diisocyanate. The remainder of the catalyst was added and the temperature was maintained at not more than 85° C. for a three to four hour period. At this point the morpholine was added to neutralize the polymer. The temperature was maintained in the 60°-70° C. range for 30 minutes under inert atmosphere. The dispersion and chain extension (in water) of the polymer was accomplished by a programmed addition of the polymer to the water with stirring. This stirring when continued until the bubbling caused by the chain extension reaction in water subsided. The addition to the water and subsequent stirring with final temperature reaching 65°-85° C. required five to seven hours.

The non-volatile content was adjusted to 40 percent by addition of water to the completed dispersion. The viscosity of this dispersion was 65 centipoise, measured on a Brookfield RVT viscometer. The average particle size was 0.24 microns, estimated from light absorption (Bausch & Lomb Spectronic 20). Properties measured from films cast from the dispersion (Instron Model 1130) were as follows:

| 100 percent Modulus | 300 psi |
|---|---|
| (stress required to double length of the film) | |
| Tensile strength | 530 psi |
| Elongation (to break) | 300% |
| Recovery | 60% |

The films cast from the dispersion were insoluble in both dimethylformamide and tetrahydrofuran demonstrating that the film was formed by the coalescence of discrete gel or crosslinked particles. From the gel point calculations for this polymer system below, it is shown that the prepolymer is close to gelation prior to dispersion and crosslinked subsequent to dispersion and chain extension.

| Reactants | Functionality | Equivalents |
|---|---|---|
| GP-6500 | 3 | 1.0 |
| dimethylol propionic acid | 2 | 1.42 |
| Water | 2 or 1 | Excess |
| Hylene W | 2 | 4.5 |
| $P_{OH} = 1.0$ | $P_{NCO} = 0.54$ | |
| $\rho = 0.413$ | | |
| $\alpha = 0.326$ | | |
| $\alpha_c = 0.5$ | | |

The NCO at the start of the dispersing step was 3.04%. From the gel point equations, it may be calculated that after only 51.9 percent of the remaining isocyanate reacts with a difunctional chain extender, the growing chains become infinite networks and hence crosslinked.

EXAMPLE 4

| Ingredient | Parts by Weight |
|---|---|
| tolylene diisocyanate | 5.0 |
| P-538 triol | 23.0 |
| (hydroxyl #35.4; product of BASF Wyandotte propoxyalkylated trimethylol propane) C.A.S. No. 51248-49-8 | |
| dimethylol propionic acid | 1.3 |
| (2,2-bis(hydroxymethyl) propionic acid) | |
| N—methyl-2-pyrrolidone | 3.0 |
| N—ethyl morpholine | 1.1 |
| Water | 67.0 |

The tolylene diisocyanate and the P-538 triol were combined under an inert nitrogen atmosphere at 15°-30° C. with stirring. The polyol/diisocyanate was then reacted for a period of two hours or less at a temperature of not more than 70° C. At this point, a solution of the dimethylol propionic acid in the pyrrolidone was added to the polyol/diisocyanate. After the addition of the dimethylol propionic acid, the temperature was again maintained at not more than 70° C. for a period of two to three hours. The morpholine was added to neutralize the polymer while still maintaining a temperature less than 70° C. for a 30 minute period. The chain extension and dispersion of the polymer in water was achieved by the addition of the polymer to the water with stirring until bubbling caused by the chain extension reaction ceased. The addition to water and subsequent stirring with a final temperature of 50°-60° C. typically required three to four hours.

The non-volatile content was adjusted to 30 percent by addition of water to the completed dispersion. The viscosity of this dispersion was 130 centipoise, measured on a Brookfield RVT viscometer. The average particle size, estimated from light absorption using a Bausch & Lomb Spectronic 20 was 0.42 microns. Properties measured using Instron Model 1130 on films cast from the dispersion were as follows:

| 100 percent Modulus | 120 psi |
| Tensile strength | 180 psi |
| Elongation | 220% |
| Recovery | 85% |

Films cast from this dispersion were insoluble in both dimethylformamide and tetrahydrofuran demonstrating that the film was formed by a coalescence of discrete gel particles. Gel point calculations show that the polymer is close to gelation when dispersed and gelled or crosslinked subsequent to dispersion and chain extension.

| Reactants | Functionality | Equivalents |
|---|---|---|
| P-538 triol | 3 | 1.0 |
| tolylene diisocyanate | 2 | 3.9 |
| dimethylol propionic acid | 2 | 1.42 |
| Water | 2 or 1 | excess |
| $P_{OH} = 1.0$ | $P_{NCO} = 0.62$ | |
| $\rho = 0.413$ | | |
| $\alpha = 0.402$ | | |
| $\alpha_c = 0.5$ | | |

The percent NCO at the start of the dispersing step was 2.76. From the gel point equations, it may be calculated that after only 32.4% of the remaining isocyanate reacts with a difunctional chain extender, the growing chains become infinite networks.

EXAMPLE 5

| Ingredient | Parts by Weight |
|---|---|
| tolylene diisocyanate | 4.1 |
| P-380 triol | 24.1 |
| (hydroxyl #25 from BASF Wyandotte propoxyalkylated trimethylol propane) C.A.S. No. 51248-49-8 | |
| dimethylol propionic acid | 1.0 |
| (2,2-bis(hydroxymethyl) propionic acid) | |
| N—methyl-2-pyrrolidone | 2.2 |
| N—ethyl morpholine | 1.0 |
| Water | 67.6 |

The P-380 triol and tolylene diisocyanate were combined with stirring under an inert atmosphere at 10°-30° C. The polyol/diisocyanate combination was reacted at 70° C. or less for two hours. A solution of the dimethylol propionic acid was then added to the polyol/diisocyanate combination. After the addition, temperature was maintained at 70° C. or less for a period of two hours. Morpholine was added to neutralize the polymer while keeping the polymer temperature in the range of 60°-80° C. for a 30 minute period. The chain extension and dispersion of the polymer in water was accomplished by the addition of the polymer to water with stirring until the bubbling caused by the chain extension reaction ceased. The addition to water and subsequent stirring with a final temperature of 50°-60° C. typically required three to four hours.

The non-volatile content was adjusted to 30 percent by the addition of water to the completed dispersion. The viscosity of this dispersion was 560 centipoise, measured on a Brookfield RVT viscometer. The average particle size, estimated from light absorption measurements taken on a Bausch & Lomb Spectronic 20, was 0.84 microns. Properties measured using Instron Model 1130 on films cast from the dispersion were as follows:

| 100 percent Modulus | 10 psi |
| Tensile strength | 400 psi |
| Elongation | 600% |
| Recovery | 80% |

The films cast from this dispersion were not soluble in either dimethylformamide or tetrahydrofuran demonstrating that the films were formed by the coalescence of crosslinked polyurethane particles. Gel point calculations show that the polymer was near gelation when dispersed and crosslinked subsequent to dispersion and chain extension.

| Reactants | Functionality | Equivalents |
|---|---|---|
| P-380 triol | 3 | 1.0 |
| Tolylene diisocyanate | 2 | 4.4 |
| dimethylol propionic acid | 2 | 1.42 |
| Water | 2 or 1 | Excess |
| $P_{OH} = 1.0$ | $P_{NCO} = 0.55$ | |
| $\rho = 0.413$ | | |
| $\alpha = 0.402$ | | |
| $\alpha_c = 0.5$ | | |

The percent NCO at the start of the dispersing step was 2.83 percent. From the gel point equations, it may be calculated that after only 33.5 percent of the remaining isocyanate reacts with a difunctional chain extender, the growing chains become infinite networks.

EXAMPLE 6

| Ingredient | Parts by Weight |
|---|---|
| Tolylene diisocyanate | 32.6 |
| GP-700 triol | 30.0 |
| (hydroxyl #233.7 from Choate Chemical C.A.S. No. 25791-96-2 trifunctional hydroxy compound of oxyalkylated glycerol) | |
| dimethylol propionic acid | 11.8 |
| (2,2-bis(hydroxymethyl) propionic acid) | |
| N—methyl-2-pyrrolidone | 25.6 |
| N—ethyl morpholine | 10.1 |

The tolylene diisocyanate was combined with the GP-700 triol with stirring under an inert nitrogen atmosphere while maintaining a temperature of 10°-30° C. The triol/isocyanate combination was reacted at a temperature of not more than 60° C. for a two hour period. A solution of the dimethylol propionic acid in pyrrolidone was then added to the polyol/diisocyanate. The temperature was maintained at 50°-60° C. There was a gradual increase in viscosity over the next hour. When the morpholine was added to neutralize, the polymer proceeded to gel.

According to calculations, the gel point of the polymer was exceeded. This example demonstrates the validity of the calculations and equations when applied to the polymeric systems described.

| Reactants | Functionality | Equivalents |
|---|---|---|
| GP-700 | 3 | 1.0 |
| dimethylol propionic acid | 2 | 1.42 |
| tolylene diisocyanate | 2 | 3.0 |
| $P_{OH} = 1.0$ | $P_{NCO} = 0.807$ | |
| $p = 0.413$ | | |
| $\alpha = P_{OH} P_{NCO} p/[1 - P_{OH} P_{NCO}(1 - p)]$ | | |
| $\alpha = 0.633$ | | |
| $\alpha_c = 0.5$ | | |

EXAMPLE 7

| Ingredient | Parts by Weight |
|---|---|
| Tolylene diisocyanate | 11.78 |
| P-1010 diol (hydroxyl #112 from BASF Wyandotte C.A.S. No. 25322-69-4 polypropylene oxide glycol) | 18.21 |
| dimethylol propionic acid (2,2-bis(hydroxymethyl) propionic acid) | 2.97 |
| N—methyl-2-pyrrolidone | 3.21 |
| N—ethyl morpholine | 2.42 |
| Water | 59.49 |

The diol was combined with the tolylene diisocyanate while stirring under an inert atmosphere at 10°-30° C. at 65° C. or less for a period of one hour. A solution of the dimethylol propionic acid and pyrrolidone was then added to the diol/diisocyanate combination, maintaining the temperature below 75° C. A temperature of 75° C. or less was maintained for a period not to exceed one hour. Morpholine was added to neutralize the polymer while holding the temperature in the range of 60°-80° C. for a thirty minute period. The dispersion and chain extension of the polymer in water was accomplished by the addition of the polymer to water with stirring until the bubbling caused by the chain extension reaction ceased. The addition to water and subsequent stirring with a final temperature of 50°-60° C. typically required four to six hours.

The non-volatile content was adjusted to 35% by the addition of water to the completed dispersion. The viscosity was 250 cps, measured on a Brookfield RVT viscometer. The average particle size, estimated from light absorption measurements taken on a Bausch & Lomb Spectronic 20, was 0.14 microns. Properties measured using Instron Model 1130 on films cast from the dispersion were as follows:

| 100% Modulus | 1300 psi |
|---|---|
| Tensile strength | 2500 psi |
| Elongation | 250% |
| Recovery | 30% |

The films cast from this dispersion and dried at room temperature, dissolved readily in tetrahydrofuran, demonstrating that the film was non-crosslinked as opposed to the crosslinked films of Examples 1 through 5.

Although the invention has been described with reference to specific components the invention is only to be limited so far as is set forth in the accompanying claims.

I claim:

1. A stable aqueous polyurethane ionic dispersion comprised of crosslinked polyurethane polymer particles dispersed by the incorporation of a polyfunctional active hydrogen compound having a solubilizing group therein incorporated into the polymer chain, said crosslinked particles being crosslinked beyond the point of gelation and being capable of coalescing to form a continuous film upon drying of the dispersion at a temperature of 65° to 75° F. and atmospheric pressure.

2. The dispersion of claim 1 having an average particle size of one micron or less.

3. The dispersion of claim 1 having a solids content of 50 percent or less.

4. The dispersion of claim 1 having a viscosity of 5,000 centipoise or less.

5. The dispersion of claim 1 wherein said polyurethane polymer is solubilized by the incorporation of a sterically hindered acid salt incorporated into the polymer chain.

6. The dispersion of claim 5 wherein said sterically hindered acid salt is the amine salt of a 2,2-di-(hydroxymethyl) substituted carboxylic acid.

7. The dispersion of claim 6 wherein said 2,2-di-(hydroxymethyl) substituted carboxylic acid is 2,2-di-(hydroxymethyl) propionic acid.

8. The dispersion of claim 6 wherein the amine moiety of said salt is a water soluble monoamine.

9. The dispersion of claim 1 wherein said polyurethane contains a reacted triol.

10. The dispersion of claim 9 wherein said triol is a polyether triol.

11. The dispersion of claim 1 wherein said polyurethane contains reacted tolylene diisocyanate.

12. A method of preparing an aqueous ionic polyurethane dispersion comprising:
   reacting a mixture of polyfunctional hydrogen compounds including a polyfunctional hydrogen compound having a functionality of three or more and a polyfunctional reactive hydrogen compound having an ionically neutralizable solubilizing group thereon, with an isocyanate to react with the functional groups of said hydrogen compounds to form uncrosslinked prepolymer having unreacted isocyanate groups therein;
   ionically neutralizing said solubilizing group to render said prepolymer water dispersible;
   dispersing said prepolymer in water;
   chain extending said dispersed prepolymer with a difunctional chain extending compound to form an isocyanate free dispersion of crosslinked polyurethane, said crosslinked polyurethane being crosslinked beyond the point of gelation.

13. The method of claim 12 wherein said neutralizable solubilizing group is an acid group.

14. The method of claim 13 wherein said neutralizable solubilizing group is a carboxylic acid group.

15. The method of claim 14 wherein said polyfunctional reactive hydrogen compound having a neutralizable solubilizing group is a 2,2-di(hydroxymethyl) substituted carboxylic acid.

16. The method of claim 15 wherein said 2,2-di(hydroxymethyl) substituted carboxylic acid is 2,2-di(hydroxymethyl) propionic acid.

17. The method of claim 12 wherein said solubilizing group is neutralized with a water soluble amine.

18. The method of claim 12 wherein said polyfunctional hydrogen compound having a functionality of three or more is a polyol.

19. The method of claim 18 wherein said polyfunctional hydrogen compound having a functionality of three or more is a triol.

20. The method of claim 19 wherein said triol is a polyester.

21. The method of claim 12 wherein said chain extension is conducted by the addition of said prepolymer to water.

22. The method of claim 21 wherein said chain extension is conducted by the addition of said prepolymer to a solution of water and a water soluble diamine.

23. The method of claim 12 wherein said crosslinked polyurethane is capable of coalescing to form a continuous film upon drying of the dispersion at a temperature of 65° to 75° F. and atmospheric pressure.

24. The method of claim 12 wherein the level of reacted constituents of said prepolymer is defined by:

$$1/(f-1) > P_{OH}P_{NCO}\,\rho/[1 - P_{OH}P_{NCO}(1-\rho)]$$

wherein
- $f$ = functionality of the polyfunctional reactive hydrogen compound having a functionality of three or greater
- $P_{OH}$ = the fraction of reactive hydrogens that have been reacted
- $P_{NCO}$ = the fraction of isocyanate groups reacted
- $\rho$ = the ratio of reactive hydrogens in the polyfunctional reactive hydrogen compound having a functionality of three or greater, to the total reactive hydrogen.

25. The method of claim 24 wherein the level of reacted constituents of the crosslinked polyurethane in said dispersion is defined by:

$$1/(f-1) < P_{OH}P_{NCO}\,\rho/[1 - P_{OH}P_{NCO}(1-\rho)].$$

* * * * *